US008339739B2

(12) United States Patent
Balamane et al.

(10) Patent No.: US 8,339,739 B2
(45) Date of Patent: Dec. 25, 2012

(54) THERMALLY ASSISTED RECORDING HEAD WITH NEAR FIELD TRANSDUCER HAVING INTEGRAL HEATSINK

(75) Inventors: Hamid Balamane, Portola Valley, CA (US); Jordan Asher Katine, Mountain View, CA (US); Neil Leslie Robertson, Palo Alto, CA (US); Barry Cushing Stipe, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 339 days.

(21) Appl. No.: 12/807,296

(22) Filed: Aug. 31, 2010

(65) Prior Publication Data

US 2012/0050906 A1    Mar. 1, 2012

(51) Int. Cl.
*G11B 5/187* (2006.01)
(52) U.S. Cl. ............ 360/125.3; 360/125.31; 360/125.32
(58) Field of Classification Search ............... 360/125.3, 360/125.31, 125.32, 125.03, 125.06, 125.07, 360/125.08
See application file for complete search history.

(56) References Cited

U.S. PATENT DOCUMENTS

| 6,950,598 | B1 | 9/2005 | Tawa et al. |
| 7,492,804 | B2 | 2/2009 | Tawa |
| 8,169,881 | B2 * | 5/2012 | Balamane et al. ....... 369/112.27 |
| 2007/0041119 | A1 | 2/2007 | Matsumoto et al. |
| 2007/0139818 | A1 | 6/2007 | Shimazawa et al. |
| 2007/0230048 | A1 | 10/2007 | Hasegawa |
| 2008/0192616 | A1 | 8/2008 | Tawa et al. |
| 2009/0073597 | A1 | 3/2009 | Shiramatsu et al. |
| 2010/0214685 | A1 * | 8/2010 | Seigler et al. .................... 360/59 |
| 2012/0070784 | A1 * | 3/2012 | Balamane et al. ............ 430/296 |
| 2012/0092791 | A1 * | 4/2012 | Taguchi et al. ................. 360/59 |
| 2012/0105996 | A1 * | 5/2012 | Katine et al. .................... 360/59 |
| 2012/0127610 | A1 * | 5/2012 | Aoyama et al. .......... 360/123.05 |
| 2012/0127839 | A1 * | 5/2012 | Rawat et al. ............... 369/13.33 |

FOREIGN PATENT DOCUMENTS

| JP | 2007-026593 | 2/2007 |
| JP | 2007-317259 | 12/2007 |
| JP | 2008-243295 | 10/2008 |
| WO | WO2009-044663 | 4/2009 |

OTHER PUBLICATIONS

Stipe et al., Ridge Waveguide for Thermally Assisted Recording, Optimization, Scaling, and Wavelength Dependence, Intermag 2006, FB-12.

* cited by examiner

*Primary Examiner* — Jefferson Evans
(74) *Attorney, Agent, or Firm* — D'Arcy H. Lorimer; Lorimer Labs (57) ABSTRACT

A write head structure for use with thermally assisted recording is disclosed. Improved heat sinking is provided for removing thermal energy created by a ridge aperture near field light transducer. Metal films conduct heat away from the region near the ridge aperture to the high pressure air film at the ABS between the head and media. This heat is further dissipated by the media. The metal films have varying thickness to improve lateral conductivity and may be composed of Au combined with a harder metal such as Ru to improve wear characteristics at the ABS.

19 Claims, 8 Drawing Sheets

THERMALLY ASSISTED RECORDING HEAD WITH NEAR FIELD TRANSDUCER HAVING INTEGRAL HEATSINK

BACKGROUND OF THE INVENTION

1. Field of the Invention

This invention relates to structures of thin film magnetic write heads. More specifically, the invention relates to structures of a thin film write heads for thermally assisted magnetic recording, wherein an optical aperture serving as ridge waveguide near field optical source is integrated with heat sinking components situated at the air bearing surface.

2. Description of the Related Art

The ongoing quest for higher storage bit densities in magnetic media used in, for example, hard disk drives, have reduced the size (volume) of data cells to the point where the cell dimensions are limited by the grain size of the magnetic material. Although grain size can be reduced further, there is concern that data stored within the cells is no longer thermally stable, as random thermal fluctuations at ambient temperatures are sufficient to erase data. This state is described as the superparamagnetic limit, which determines the maximum theoretical storage density for a given magnetic media. This limit may be raised by increasing the coercivity of the magnetic media or lowering the temperature. Lowering the temperature is not a practical option when designing hard disk drives for commercial and consumer use. Raising the coercivity is a practical solution, but requires write heads employing higher magnetic moment materials, or techniques such as perpendicular recording (or both).

One additional solution has been proposed, which employs heat to lower the effective coercivity of a localized region on the magnetic media surface; writes data within this heated region with a broad magnetic field; and, "fixes" the data state by cooling the media to ambient temperatures. This technique is broadly referred to as "thermally assisted (magnetic) recording", TAR or TAMR. Heat is applied to a magnetic substrate via a very small, but intense light source to reduce the anisotropy of fine grain magnetic media. A potential advantage is that lower field gradients produced by heads having broader field dimensions may be used, which relaxes the tight dimensional requirements of the magnetic source or write head. It can be applied to both longitudinal or perpendicular recording systems, although the highest density state of the art storage systems are more likely to be perpendicular recording systems. Heating of the media surface is accomplished by a number of techniques such as focused laser beams or near field optical sources. To be useful for high density recording, the light source utilized for heating must be on the order of 50 nm or less in diameter. This is far beyond the optical diffraction limit for conventional light sources such as solid state lasers, which leaves near field optical sources as the preferred heating method.

One method that commonly used to produce near-field light is the ridge aperture or "C" shaped aperture. The device consists of rectangular shaped aperture fashioned in an electrically conductive metal film. Extending into the center portion of the aperture is an electrically conductive ridge, generally an extension of the surrounding metal film. Incident radiation, polarized in the direction parallel to the ridge produces an intense pattern of near-field light which appears close to or at the end of the ridge, in the gap between the end of the ridge and the opposing boundary of the aperture.

While the near field light source is positioned to induce heating in the magnetic media, a certain percentage of heat will also be generated in the magnetic head, particularly in the vicinity of the ridge aperture. This heating can affect the shape of the head at the ABS, and therefore impact the fly height. Heating of the head can also impact the reliability and performance of the head because high temperatures can accelerate thermal migration of various films and structures, causing inter-diffusion and dimensional smearing. Therefore it may be necessary to dissipate excessive heat created by the near field light source and radiated to the magnetic head by providing appropriate heat sinking.

What is needed is an improved method for thermally assisted recording.

SUMMARY OF THE INVENTION

It is an object of the present invention to provide a thin film magnetic head for thermally assisted recording, having a near field light source, containing an upper pole tip layer; a pole lip, magnetically coupled to the upper pole tip layer; a metal layer, having an outer surface located approximately co-planar with the air bearing surface, the metal layer thermally coupled to the upper pole tip layer and the pole lip; and a ridge aperture, fashioned within the metal layer and bounded on one side by the pole lip, the metal layer having a first thickness at an inner boundary defining the ridge aperture, the metal layer having a second thickness at an outer boundary defining the metal layer, the second thickness being greater than the first thickness.

It is another object of the present invention to provide a thin film magnetic head for thermally assisted recording, having a near field light source, containing an upper pole tip layer; a pole lip, magnetically coupled to the upper pole tip layer; a first metal layer, having an outer surface located approximately co-planar with the air bearing surface, the metal layer in contact with the upper pole tip layer and the pole lip, the first metal layer having a first thickness at contact with the pole lip, transitioning to a second thickness greater than the first thickness; a second metal layer, having a outer surface located approximately co-planar with the air bearing surface, the second metal layer in contact with the first metal layer; and a ridge aperture, fashioned within the second metal layer and bounded on one side by the pole lip, the second metal layer having the first thickness at a boundary with the ridge aperture, transitioning to the second thickness.

BRIEF DESCRIPTION OF THE DRAWINGS

The present invention will be better understood when consideration is given to the following detailed description thereof. Such description makes reference to the annexed drawings, wherein.

DETAILED DESCRIPTION OF THE PREFERRED EMBODIMENTS

Near field light sources are effective for heating the media used in thermally assisted recording. However, the proximity of the intense near field light pattern to the head itself may cause other problems if head temperatures are not controlled. These problems may include unwanted thermal expansion which can affect the shape of the head near the ABS, which in turn impacts fly height due to aerodynamic effects. Higher head temperatures may also impact device interlayer thermal migration, which in turn impacts electrical performance and long term reliability.

One method that can be used to reduce the impact of thermal loading is to incorporate heat sinks thermally coupled to the metal film surrounding the ridge (or "C") aperture. Preferably, the heat sinking provides a low heat conduction path away from the near field light source by using conductive metals and increasing the film thickness. The heat sink surface is preferably located at or near the air bearing surface (ABS) to take advantage of the high conduction (via diffusion) heat transfer provided by the high pressure air layer between the media and head. The high pressure is created by aerodynamic effects as the head "flies" above the media surface. Increasing the surface area and lateral conductivity (by increasing the film thickness) increases the heat transfer away from the regions near the ridge aperture.

Subsequently described embodiments of the present invention disclose near field light sources having a ridge aperture. It will be recognized by those skilled in the art however, that other geometries of near field light generating apertures may also be used, such as those having more than one ridge generating both single and/or multiple near field light patterns, such as those described in US Patent Application No. 2008/0149809 by Hamann et al.

Figure 1A:
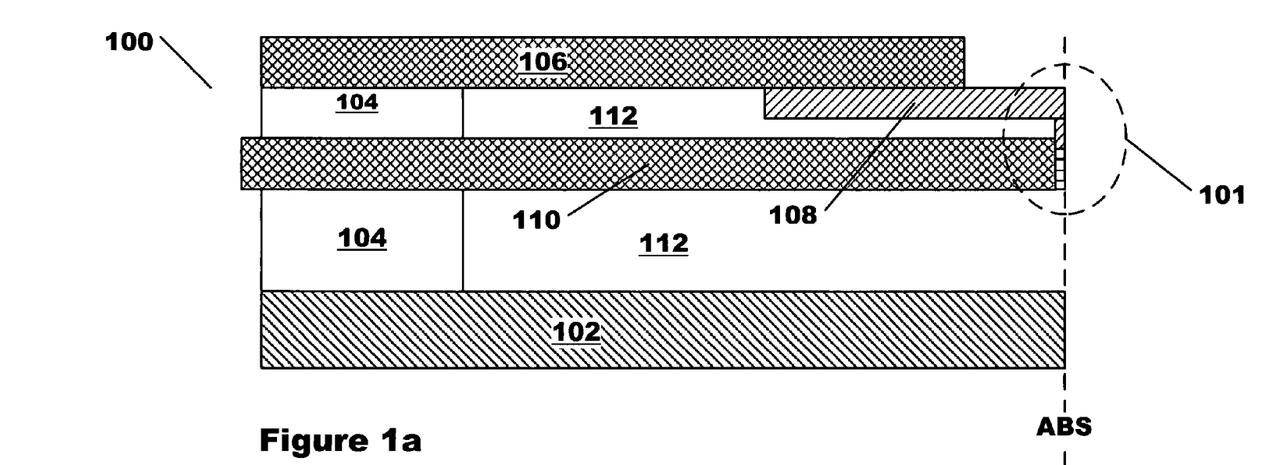
FIG. 1a is partial, cross section view of a thin film perpendicular write head design incorporating a ridge aperture near field optical source and integrated heatsink, in accordance with an embodiment of the present invention.

FIG. 1a is partial, cross section view 100 of a thin film perpendicular write head design incorporating a ridge (or "C") aperture near field optical source and integrated heatsink, in accordance with an embodiment of the present invention. In order to simplify and clarify the structures presented, spacing layers, insulating layers, and write coil layers have been omitted. The write head comprises lower return pole layer 102, back-gap layer(s) 104, upper return pole layer 106, upper pole tip layer 108. Lower return pole layer 102 may also have a lower pole tip (not shown) at the ABS. Layer 110 is an optical waveguide. Cladding layers, if present, are excluded from the figure for clarity. Layer 110 extends through at least a portion of back-gap layers 104. Detail 101 is shown in an expanded view in FIG. 1b. Coil layers (not shown) and various associated insulating and spacer layers (not shown) would reside within layers 112, bounded by the ABS, back-gap 104, lower return pole 102, and upper bounding layers 106, and 108 as would be recognized by those of skill in the art. Layers 102, 104, 106, and 108 are comprised of a suitable magnetic alloy or material, containing Co, Ni, and Fe. Layer 110 is comprised of a suitable light transmitting material, preferably tantalum pentoxide and/or titanium dioxide.

Figure 1B:
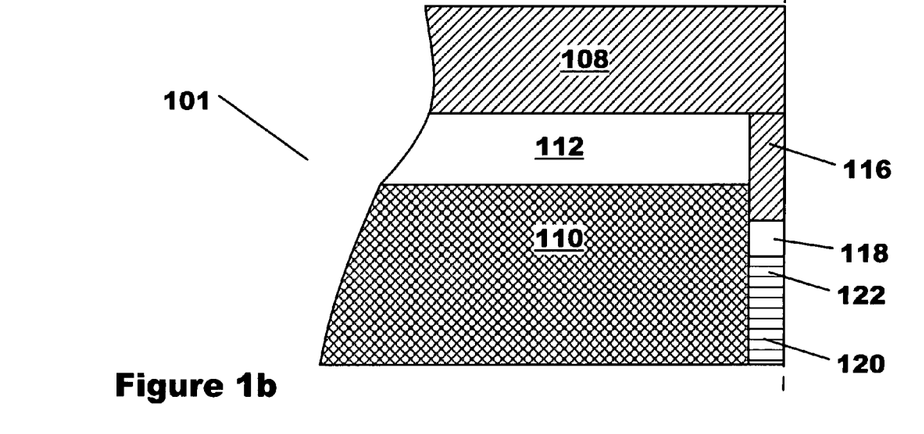
FIG. 1b is a partial cross section expanded view of detail 101 in FIG. 1a, in accordance with an embodiment of the present invention.

FIG. 1b is a partial cross section expanded view of detail 101 in FIG. 1a, in accordance with an embodiment of the present invention. Pole lip 116 is magnetically coupled to upper pole tip layer 108, and to optional magnetic step layer 114. Optically transparent layer 118 (contained within the boundaries of the ridge aperture), ridge metal layer 122, surrounding metal layer 120, and pole lip 116 comprise the near field aperture optical source, which is supplied light energy via optical waveguide 110. Pole lip 116 and optional magnetic step layer 114 are comprised of a suitable magnetic alloy, containing Co, Fe, and Ni. Metal layer 120 and ridge layer 122 are made of Au or Au alloys. Pole lip 116 has a nominal depth (as measured from the ABS) approximately equal to that of layer 120, with a value between 50 and 150 nm, preferably between 75 and 125 nm.

Figure 2A:
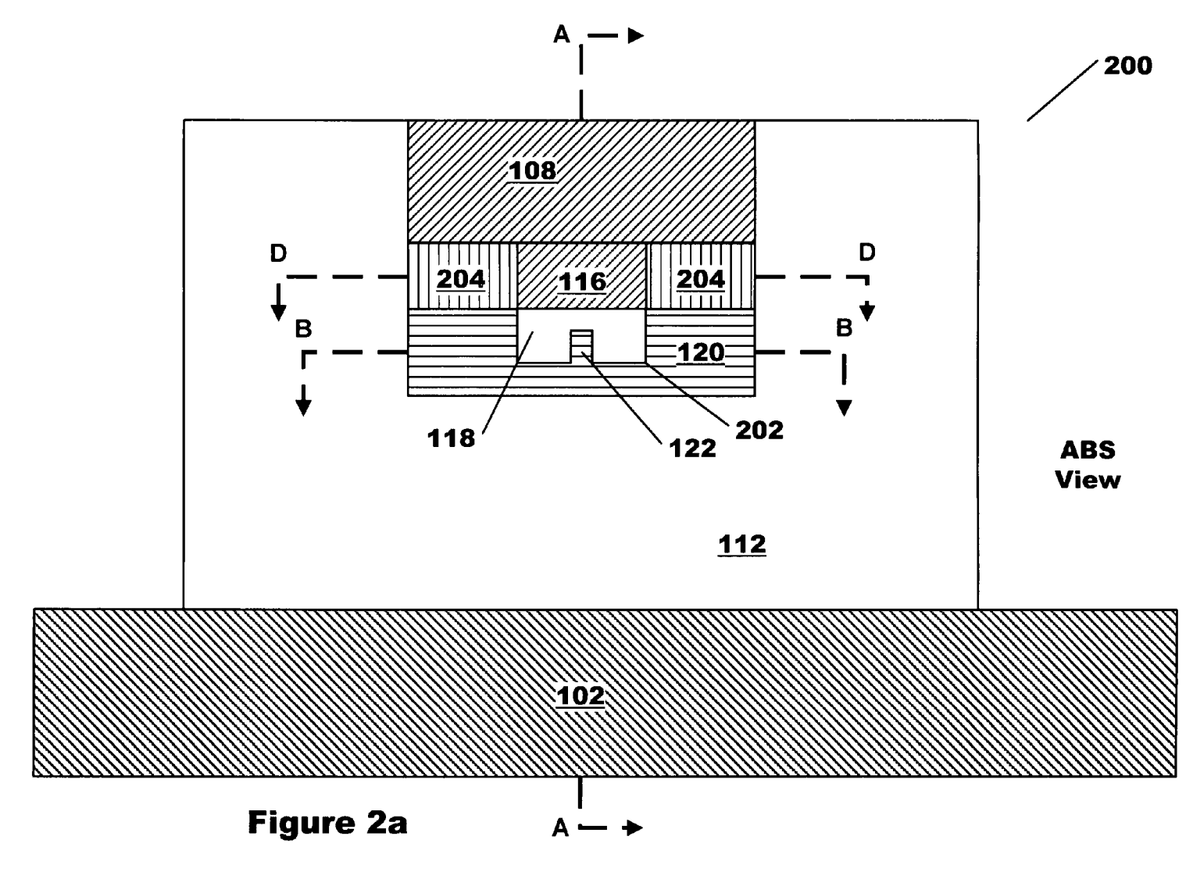
FIG. 2a is a partial air bearing surface view of the perpendicular write head of FIG. 1a, in accordance with a first embodiment of the present invention.

FIG. 2a is a partial air bearing surface view 200 of the perpendicular write head of FIG. 1a, in accordance with a first embodiment of the present invention. FIG. 1a is a view through section A-A of FIG. 2a. The ridge aperture 202 is formed by surrounding metal layer 120 and pole lip 116. Ridge layer 122 extends into the aperture from metal layer 120. Metal layers 204 are thermally coupled to pole tip layer 108, pole lip 116 and metal layer 120. Heat sinking is provided by heat transfer from layers 120, 204, pole lip 116, and pole tip layer 108 to the media via the high pressure air film at the ABS while the head is in operation. Optically transparent layer 118 is contained within the boundaries of surrounding metal layers 120, 122, and 116 which define the ridge aperture 202. Generally, layer 118 is comprised of a dielectric material having suitable optical transparency. Metal layers 204 typically are made from Cr, Ir, Pt, Pd, Ru and Rh, as these metals are good heat conductors as well as being harder than Au. They also exhibit good corrosion resistance. The hardness and corrosion resistance are important for surfaces used at the ABS, to provide the required longevity and reliability of the head. Preferably, metal layer 204 is comprised of Ru.

Figure 3A:
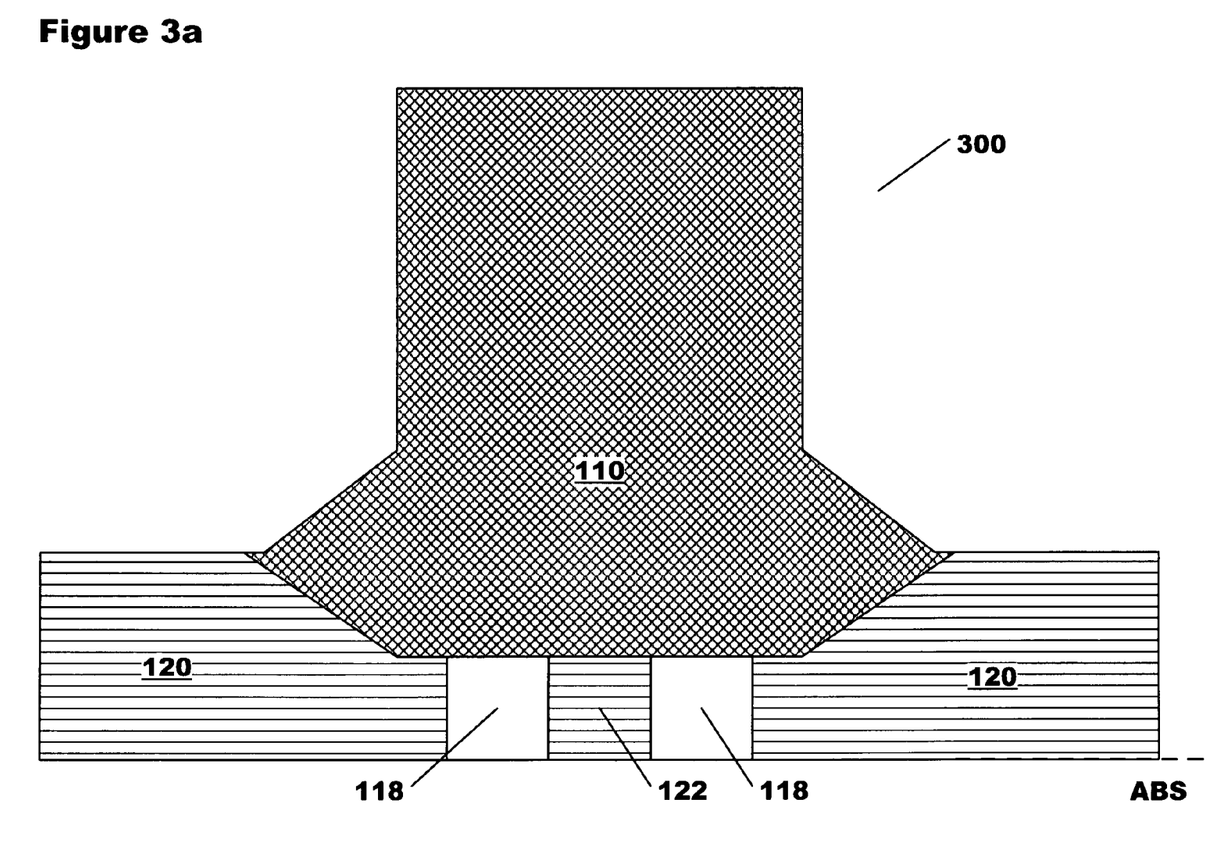
FIG. 3a is a partial plan view through section B-B of FIG. 2a, in accordance with the first embodiment of the present invention.

FIG. 3a is a partial plan view 300 through section B-B of FIG. 2a, in accordance with the first embodiment of the present invention. Metal layer 120 thickness (as measured from the ABS inward) progressively increases as the structure extends from the boundaries of the ridge aperture. The increased thickness can range from 100 nm to 1000 nm, but is preferably between 250 to 500 nm. This shape facilitates improved conductive heat transfer within layer 120 to metal layers 204 and upper pole tip layer 108 (not shown, refer to FIG. 2a). Furthermore, extension of layer 120 along the ABS increases the heat transfer area through which heat can be dissipated through the high pressure air film at the ABS to the media. Heat transfer also occurs from pole lip layer 116, metal layers 204, and upper pole tip layer 108 to the media in a similar manner. Conductive heat transfer may also occur from layers 120, 204, 116 to other structures within the body of the head via upper pole tip layer 108, but this is expected to be of minor importance when compared to the conduction/diffusion heat transfer to the recording media.

Figure 4A:
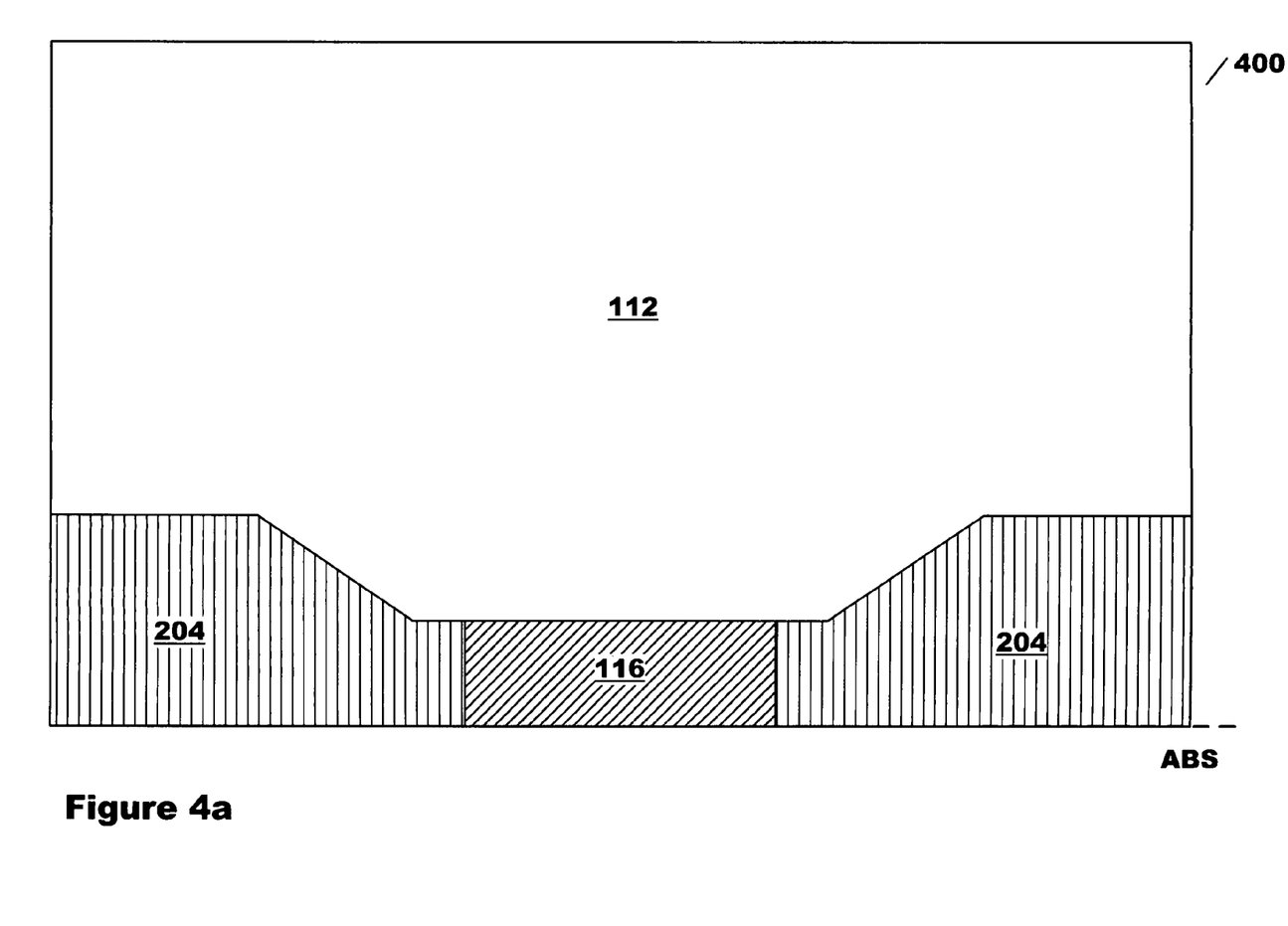
FIG. 4a is a partial plan view through section D-D of FIG. 2a, in accordance with the first embodiment of the present invention.

FIG. 4a is a partial plan view 400 through section D-D of FIG. 2a, in accordance with the first embodiment of the present invention. Metal layer 204 thickness (as measured from the ABS) parallels that of metal layer 120 below it. This increase in thickness not only improves the conduction of heat away from the ridge aperture, but also improves conduction to upper pole tip layer 108.

Figure 2B:
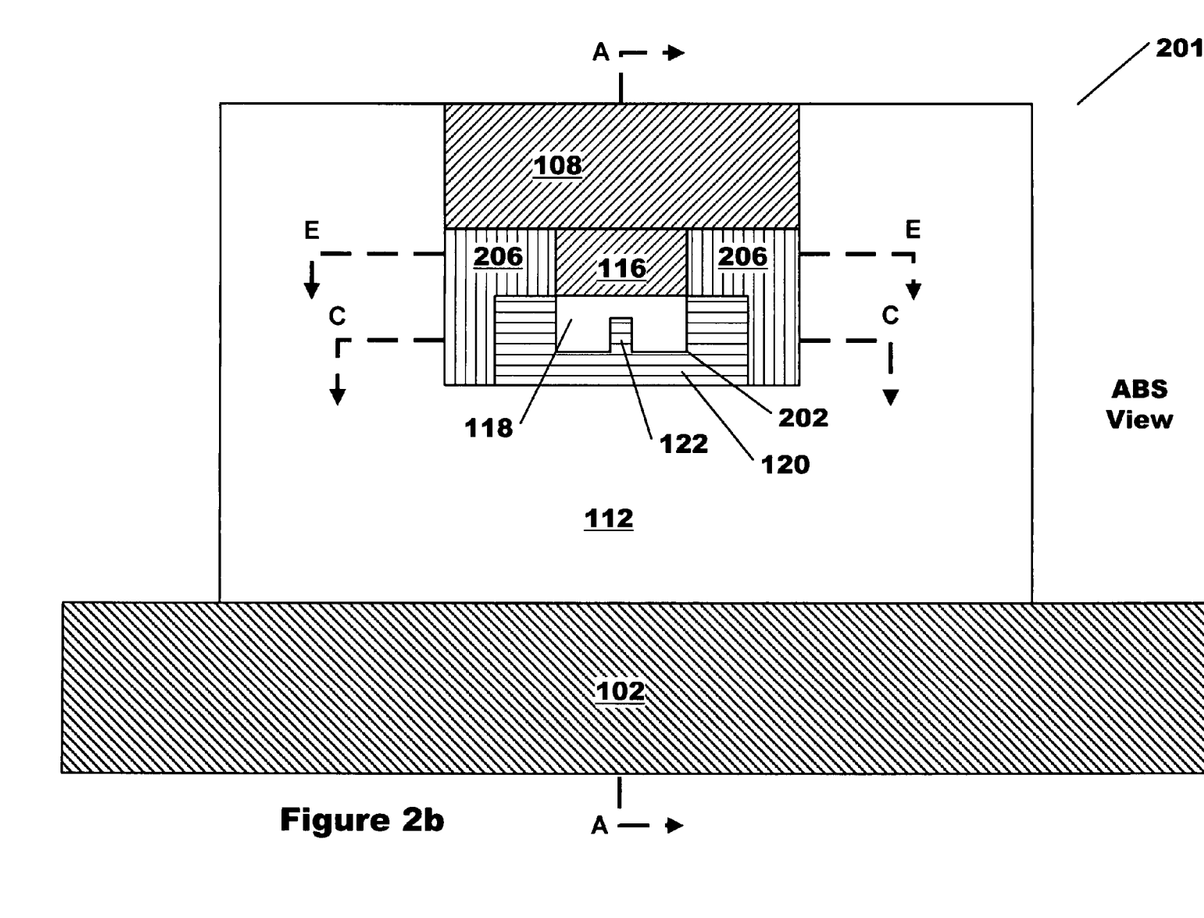
FIG. 2b is a partial air bearing surface view of the perpendicular write head of FIG. 1a, in accordance with a second embodiment of the present invention.

FIG. 2b is a partial air bearing surface view 201 of the perpendicular write head of FIG. 1a, in accordance with a second embodiment of the present invention. Ridge aperture 202, optically transparent layer 118, and ridge layer 122 are as described in FIG. 2a. However, the lateral dimension of softer metal layer 120 is reduced compared to layer 120 in FIG. 2a, and substituted with portions of a harder material in metal layer 206. Metal layer 206 is composed of the same materials cited for metal layer 204 above. This embodiment provides improved wear characteristics at the ABS compared to the embodiment of FIG. 2a, due to the increased surface area of the harder metals comprising layer 206. Heat sinking is provided by heat transfer from layers 120, 206, and pole lip 116 to the media via the high pressure air film at the ABS, coupled with conduction to upper pole tip layer 108 which also transfers heat to the media via its exposed surface area at the ABS.

Figure 3B:
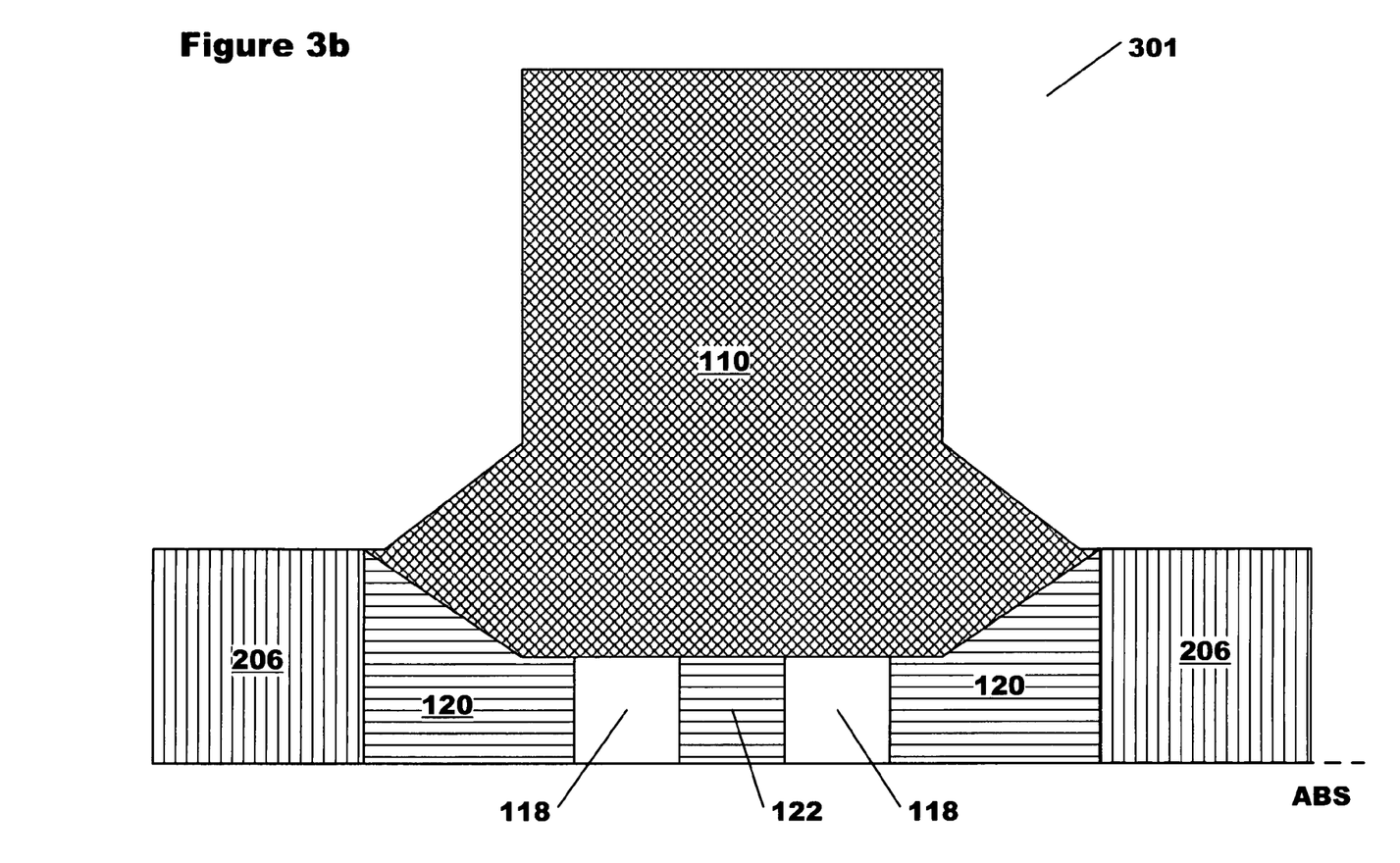
FIG. 3b is a partial plan view through section C-C of FIG. 2b, in accordance with the second embodiment of the present invention.

FIG. 3b is a partial plan view 301 through section C-C of FIG. 2b, in accordance with the second embodiment of the present invention. Metal layer 120 thickness (as measured from the ABS inward) progressively increases as the structure extends from the boundaries of the ridge aperture. The increased thickness can range from 100 nm to 1000 nm, but is preferably between 250 to 500 nm. Metal layer 120 transitions into metal layer 206 on both sides of the ridge aperture. Metal layers 120 and 206 are in intimate thermal contact, facilitating heat transfer from the ridge aperture. Heat transfer occurs from layer 120, pole lip layer 116, metal layers 206, and upper pole tip layer 108 to the media via the high pressure air film at the ABS.

Figure 4B:
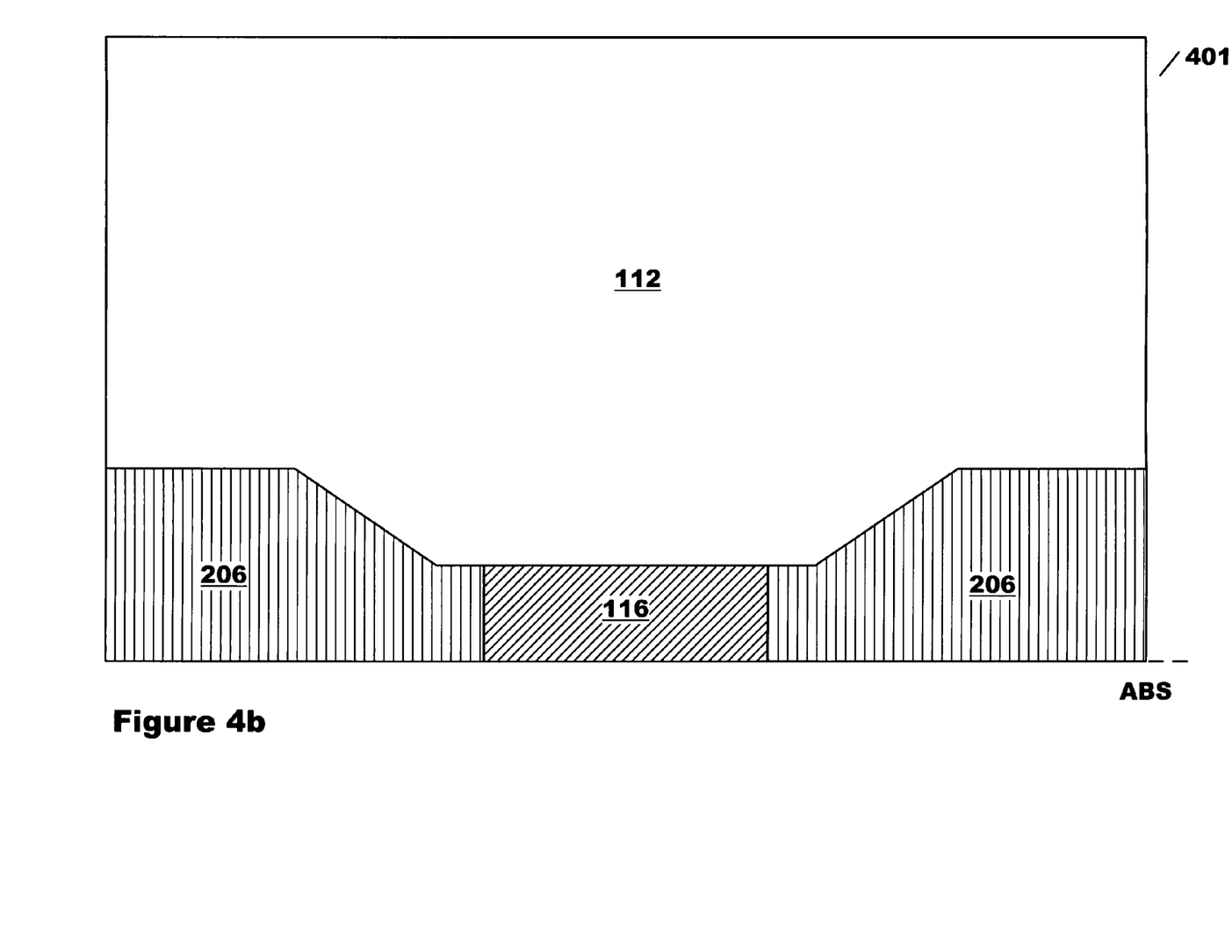
FIG. 4b is a partial plan view through section E-E of FIG. 2b, in accordance with the second embodiment of the present invention.

FIG. 4b is a partial plan view 401 through section E-E of FIG. 2b, in accordance with the second embodiment of the present invention. Metal layer 206 thickness (as measured from the ABS) parallels that of metal layers 120 and 206 below it.

EXAMPLES

Figure 3C:
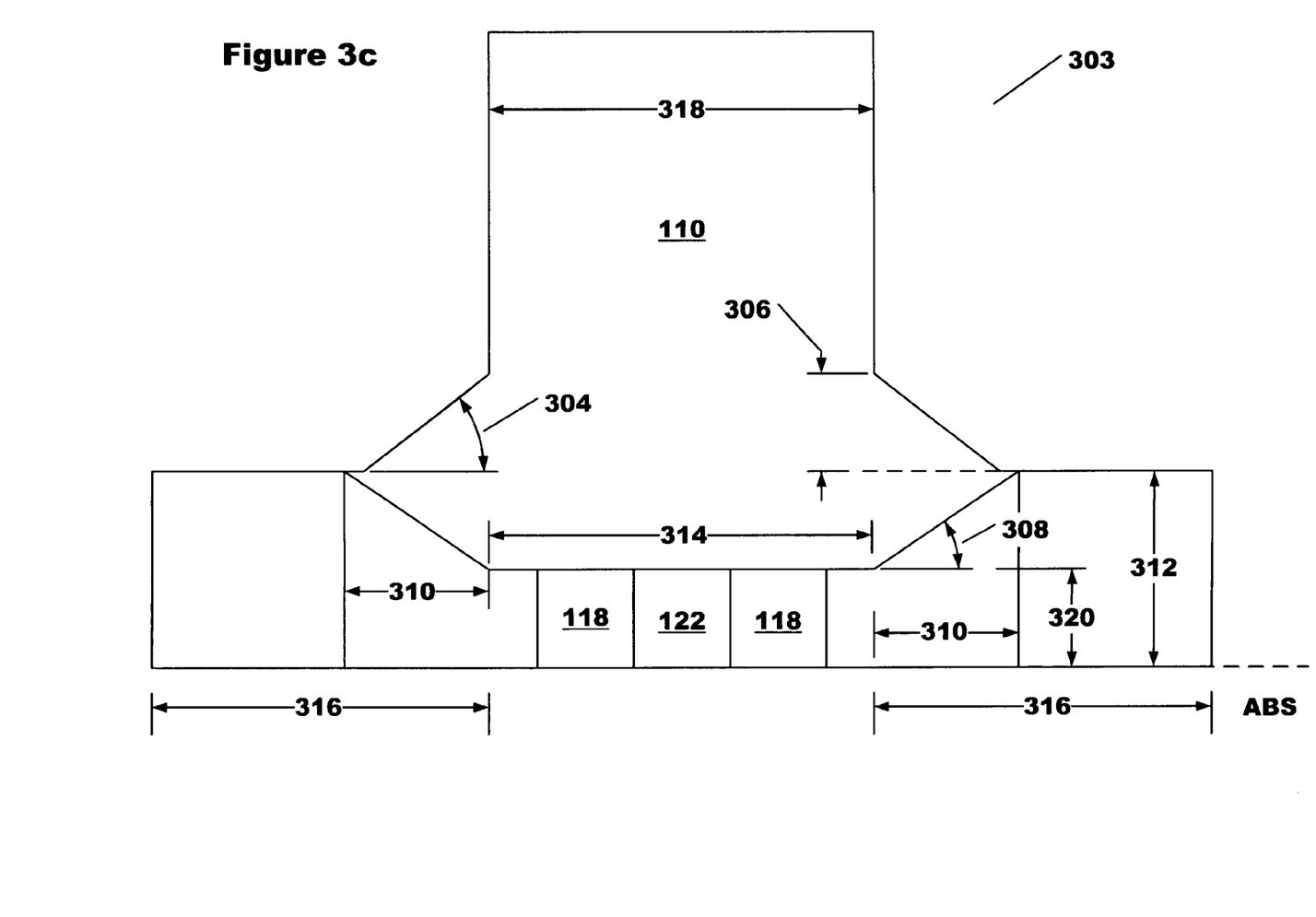
FIG. 3c is a partial plan view illustrating structural dimensions of FIGS. 3a and 3b, in accordance with embodiments of the present invention.

The following serve to provide representative embodiments of the present invention, but in no manner are meant to limit the scope, range, and function of the invention. In these examples, please refer to FIG. 3c. FIG. 3c is a partial plan view 303 illustrating structural dimensions of FIGS. 3a and 3b, in accordance with embodiments of the present invention.

Example 1

Refer to FIGS. 2a, 3a, 3c, and 4a in accordance with the first embodiment of the present invention.
Dimension 314=approx. 400 nm
Dimension 318=approx. 600 nm
Dimension 316=approx. 1000 nm
Dimension 310=approx. 575 nm
Dimension 320=approx. 100 nm
Dimension 312=approx. 310 nm
Dimension 306=approx. 150 nm
Angle 304=approx. 45 degrees
Angle 308=approx. 20 degrees
Metal layer 120 is composed of Au, metal layer 204 is composed of Ru.

Example 2

Refer to FIGS. 2b, 3b, 3c, and 4b in accordance with the first embodiment of the present invention.
Dimension 314=approx. 400 nm
Dimension 318=approx. 600 nm
Dimension 316=approx. 1000 nm
Dimension 310=approx. 575 nm
Dimension 320=approx. 100 nm
Dimension 312=approx. 310 nm
Dimension 306=approx. 150 nm
Angle 304=approx. 45 degrees
Angle 308=approx. 20 degrees
Metal layer 120 is composed of Au, metal layer 206 is composed of Ru.

Although the foregoing embodiments disclose thin film perpendicular write heads, it will be recognized by those of ordinary skill in the art, that such designs are equally applicable to thin film longitudinal write heads as well with minor modification.

The present invention is not limited by the previous embodiments heretofore described. Rather, the scope of the present invention is to be defined by these descriptions taken together with the attached claims and their equivalents.

What is claimed is:

1. A thin film magnetic head for thermally assisted recording, having a near field light source, comprising:
   an upper pole tip layer;
   a pole lip, magnetically coupled to said upper pole tip layer;
   a metal layer, having an outer surface located approximately co-planar with an air bearing surface, said metal layer thermally coupled to said upper pole tip layer and said pole lip; and
   a ridge aperture, fashioned within said metal layer and bounded on one side by said pole lip, said metal layer having a first thickness at an inner boundary defining said ridge aperture, said metal layer having a second thickness at an outer boundary defining said metal layer, said second thickness being greater than said first thickness.

2. The thin film magnetic head as recited in claim 1, further comprising an optical wave guide, said optical wave guide in contact with an inner surface of said metal layer, said ridge aperture being contained within a contact area of said optical wave guide with said inner surface of said metal layer.

3. The thin film head as recited in claim 1, wherein said metal layer comprises a first portion and a second portion.

4. The thin film head as recited in claim 3, wherein said ridge aperture is fashioned within said first portion of said metal layer.

5. The thin film head as recited in claim 4, wherein a metal film thickness of said first portion of said metal layer transitions from said first thickness at said inner boundary of said ridge aperture to said second thickness.

6. The thin film head as recited in claim 5, wherein said first portion of said metal layer comprises Au.

7. The thin film head as recited in claim 3, wherein said second portion of said metal layer is thermally coupled to said upper pole tip layer, said pole lip, and said first portion of said metal layer.

8. The thin film head as recited in claim 7, wherein a metal film thickness of said second portion of said metal layer transitions from said first thickness at said pole lip to said second thickness.

9. The thin film head as recited in claim 7, wherein said second portion of said metal layer is chosen from the group consisting of Cr, Ir, Pt, Pd, Rh, and Ru.

10. The thin film head as recited in claim 9, wherein said second portion of said metal layer comprises Ru.

11. The thin film head as recited in claim 1, wherein said first thickness is 100 nm+/−50 nm.

12. The thin film head as recited in claim 1, wherein said second thickness is 300 nm+/−50 nm.

13. A thin film magnetic head for thermally assisted recording, having a near field light source, comprising:

an upper pole tip layer;

a pole lip, magnetically coupled to said upper pole tip layer;

a first metal layer, having an outer surface located approximately co-planar with an air bearing surface, said metal layer in contact with said upper pole tip layer and said pole lip, said first metal layer having a first thickness at contact with said pole lip, transitioning to a second thickness greater than said first thickness;

a second metal layer, having a outer surface located approximately co-planar with an air bearing surface, said second metal layer in contact with said first metal layer; and a ridge aperture, fashioned within said second metal layer and bounded on one side by said pole lip, said second metal layer having said first thickness at a boundary with said ridge aperture, transitioning to said second thickness.

14. The thin film head as recited in claim 13, further comprising an optical wave guide, said optical wave guide in contact with an inner surface of said second metal layer, said ridge aperture being contained within a contact area of said optical wave guide with said inner surface of said second metal layer.

15. The thin film head as recited in claim 13, wherein said second metal layer comprises Au.

16. The thin film head as recited in claim 13, wherein said first metal layer is chosen from the group consisting of Cr, Ir, Pt, Pd, Rh, and Ru.

17. The thin film head as recited in claim 16, wherein said first metal layer comprises Ru.

18. The thin film head as recited in claim 13, wherein said first thickness is 100 nm+/−50 nm.

19. The thin film head as recited in claim 13, wherein said second thickness is 300 nm+/−50 nm.

\* \* \* \* \*